United States Patent
Sehgal et al.

(10) Patent No.: US 12,538,224 B2
(45) Date of Patent: Jan. 27, 2026

(54) POWER MANAGEMENT SCHEME FOR WIRELESS DEVICES

(71) Applicant: Western Digital Technologies, Inc., San Jose, CA (US)

(72) Inventors: Megha Sehgal, Panchkula (IN); Vishwas Saxena, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 568 days.

(21) Appl. No.: 17/727,805

(22) Filed: Apr. 25, 2022

(65) Prior Publication Data

US 2023/0345361 A1    Oct. 26, 2023

(51) Int. Cl.
*H04W 52/02* (2009.01)
*H04W 4/80* (2018.01)
*H04W 76/30* (2018.01)
*H04W 84/12* (2009.01)

(52) U.S. Cl.
CPC ......... *H04W 52/0216* (2013.01); *H04W 4/80* (2018.02); *H04W 52/028* (2013.01); *H04W 76/30* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 8,762,748 B1 * | 6/2014 | Zhang | G06F 1/3206 713/340 |
| 9,635,613 B2 | 4/2017 | Merlin et al. | |
| 10,356,142 B1 * | 7/2019 | Rajagopalan | H04L 65/611 |
| 10,834,362 B2 | 11/2020 | Siann et al. | |
| 11,378,650 B1 * | 7/2022 | Lauginiger | G01S 7/356 |
| 2012/0149305 A1 * | 6/2012 | Zhodzishsky | G06F 1/3203 455/41.2 |
| 2013/0173945 A1 * | 7/2013 | Li | G06F 1/3203 713/324 |
| 2016/0127995 A1 * | 5/2016 | Merlin | H04W 52/0229 370/311 |
| 2019/0037496 A1 * | 1/2019 | Gao | H04W 52/0225 |
| 2019/0246072 A1 * | 8/2019 | Siann | G08B 13/19656 |
| 2021/0289442 A1 * | 9/2021 | Naribole | H04W 52/0235 |

FOREIGN PATENT DOCUMENTS

| | | | | |
|---|---|---|---|---|
| KR | 20170132194 | 12/2017 | | |
| WO | WO-2009089046 A2 * | 7/2009 | | H04B 15/00 |

* cited by examiner

*Primary Examiner* — Khaled M Kassim
*Assistant Examiner* — Shima Wasel
(74) *Attorney, Agent, or Firm* — Chang & Hale LLP (57) ABSTRACT

A wireless communication device is configured to transition between power states to reduce power usage. The wireless communication device includes a power source, a first transmitter, a second transmitter, and control circuitry. The control circuitry is configured to transfer data wirelessly to a requesting client device via the first transmitter during a first power state, and in response to a disconnection of the client device from the first transmitter, determine if the client device is connected to the second transmitter. The control circuitry is further configured to, in response to determining that the client device is connected to the second transmitter, remain in the first power state, and, in response to determining that the client device is disconnected from the second transmitter, enter a second power state that utilizes less power than the first power state.

20 Claims, 7 Drawing Sheets

|  | ACTIVE MODE | LOW POWER MODE | ULTRA-LOW POWER MODE |
|---|---|---|---|
| WIRELESS RADIO | ON | ON | OFF |
| BRIDGE | ON | OFF | OFF |
| OTHER COMPONENTS | ON | OFF | OFF |

|  | ACTIVE MODE | LOW POWER MODE | ULTRA-LOW POWER MODE |
|---|---|---|---|
| WLAN RADIO | ON | OFF | OFF |
| BLUETOOTH RADIO | ON | ON | OFF |
| USB BRIDGE | ON | OFF | OFF |
| OTHER COMPONENTS | ON | OFF | OFF |

|  | ACTIVE MODE | LOW POWER MODE | ULTRA-LOW POWER MODE | CHARGING MODE | MAX POWER MODE |
|---|---|---|---|---|---|
| WLAN RADIO | OFF | OFF | OFF | OFF | ON |
| BLUETOOTH RADIO | ON | ON | OFF | ON | ON |
| USB BRIDGE | OFF | OFF | OFF | ON | OFF |
| OTHER COMPONENTS | ON | OFF | OFF | ON | ON |

FIG. 6

POWER MANAGEMENT SCHEME FOR WIRELESS DEVICES

BACKGROUND

Field

This disclosure relates to power management of wireless devices. More particularly, the disclosure relates to devices and methods for reducing power usage in wireless devices.

Description of Related Art

Wireless devices connect to other wireless devices through a radio. Wireless data transmission can be power intensive, which can use up a lot of the battery power of the wireless devices. In order to save battery life, wireless devices may go into a sleep mode during periods of inactivity.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Wireless communication is a fundamental element in any Internet of Things (IoT) based system. The IoT describes physical objects (or groups of such objects) that are embedded with sensors, processing ability, software, and other technologies that connect and exchange data with other devices and systems over the Internet or other communications networks. These devices do not need to be connected to the public internet, but instead may be connected to a network while being individually addressable. Wireless devices use radio signals to communicate with each other, instead of wire connections. Devices that support wireless data transfers, particularly mobile devices, are typically battery operated. They are energy-constrained, without any continuous source of power. Therefore, it is beneficial for the design and protocols for wireless data transmission products to be energy efficient.

Disclosed herein are systems, devices, and methods for reducing the power usage of wireless devices. Certain types of wireless devices can utilize two or more wireless transmitters, usually supporting different protocols. For example, a wireless device can include a Bluetooth® connection and a WLAN connection. Having multiple transmitters can complicate the process of entering a low power mode. For example, in a single transmitter device, a client disconnection on the transmitter may prompt the wireless device to enter a low power mode, if no other clients are connected. However, in a multi-transmitter device, the client may have disconnected from a first transmitter but still be connected to a second transmitter. In that situation, the wireless device may beneficially remain in an active mode as the client may still be trying to transfer data.

A power transition scheme that accounts for multiple transmitters can enable a more graceful transition between active, low-power, and ultra-low power modes. A disconnection event from a first transmitter can be used to trigger a determination of the appropriate power mode. The status of another transmitter can be used to provide additional information on the status and activities of clients. Otherwise, the wireless device may transition to a low power mode too soon and have to immediately transition back to an active mode. Often, moving back to an active mode may require a higher initial power usage to startup electronic components. Thus, too many transitions can end of using more energy that simply staying in the active state.

By using connection status data from the other transmitter, the power transition scheme can better identify when moving to a lower power mode would be appropriate. For example, a client that is disconnected to one transmitter but remains connected to another transmitter may have just dropped the connection to the first transmitter and the client may likely reconnect. However, a client that disconnects from both transmitters is likely done downloading data and the wireless device can safely go into the low power mode.

In addition, the power transition scheme can be extended to include status data from non-wireless connections. For example, a wireless devices may have a Bluetooth® radio, a WLAN (e.g., Wi-Fi) radio, and a Universal Serial Bus (USB) connection. The connection status data from the USB connection can be used to determine whether a client disconnect from either the Bluetooth® or the WLAN connection should result in entering a low power mode.

Wireless Device

Figure 1:
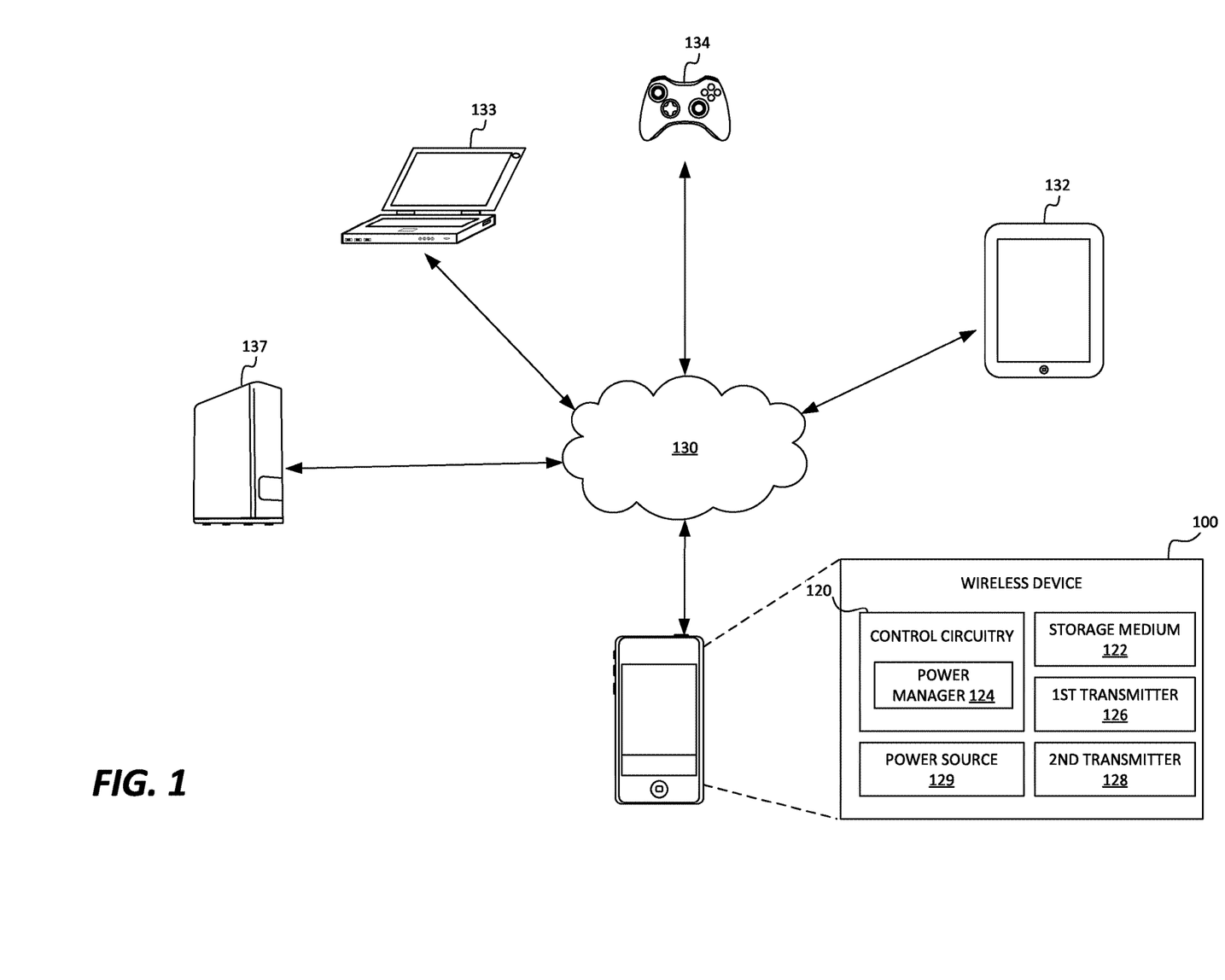
FIG. 1 is a diagram illustrating a wireless device that implements a power transition scheme for reducing power usage, according to certain embodiments.

FIG. 1 is a diagram illustrating a wireless device 100 that implements a power transition scheme for reducing power usage, according to certain embodiments. In some embodiments, the wireless device 100 includes control circuitry 120 for controlling the wireless device, a storage medium 122, a first transmitter 126, a second transmitter 128, and a power source 129. The wireless device 100 is configured to transmit and/or receive wireless communications and may sometimes be referred to as a wireless communication device.

The control circuitry 120 can include a power manager 124 for controlling the transitions between an active power mode, low power mode, and/or ultra-low power mode. In the active power mode, the device has full functionally with all or at least most components receiving full power. In the low power mode, several components, including one transmitter are turned off. In the ultra-low power mode, all or at least most components are turned off, though the control circuitry 120 and one transmitter may periodically wakeup to check for connection requests.

The wireless device 100 can include a storage medium 122. For example, the wireless device 100 may be a data storage device. The storage medium 122 can employ a variety of storage technologies and/or form factors. For example, the storage medium 122 may be an internal drive such as a solid state drive (SSD) or Secure Digital (SD) card that uses semiconductor memory, a hard disk drive (HDD) that uses magnetic disks, or a solid state hybrid drive (SSHD) that uses a combination of semiconductor memory and magnetic disk technology. The storage medium 122 may also be memory chips or other form of non-volatile memory that may be directly attached to a printed circuit board (PCB).

The storage medium 122 can utilize various types of non-volatile memory (NVM) to permanently store data. NVM is a type of computer memory that can retain stored information even after power is removed. For example, the storage medium 122 can include one or more magnetic disks and/or semiconductor memory. The semiconductor memory can include any of various memory technologies, such as NAND memory and its variations like SLC (Single Level Cell), eMLC (Enterprise Multi Level Cell), MLC (Multi Level Cell), TLC (Triple Level Cell), and QLC (Quadruple Level Cell). New types of emerging non-volatile memory could also be used such as Program in Place or Storage Class Memory (SCM) such as ReRam, Phase-Change Memory (PCM), and Magnetoresistive RAM (MRAM).

In some embodiments, the control circuitry 120 is configured to manage semiconductor memory or magnetic technology. For example, the control circuitry 120 may include or be a data storage device controller. In some embodiments, the control circuitry 120 is configured to manage a wireless interface. For example, the control circuitry 120 may include or be a Bluetooth® controller (or a variation such as Bluetooth® Low Energy (BLE)), WLAN controller, or other wireless technology controller. The control circuitry 120 can include an embedded processor, electrically erasable firmware read-only-memory (ROM), system random access memory (RAM), error correction code (ECC) circuitry, head controller, voice coil motor (VCM) controller, and/or a host electrical interface such as serial ATA (SATA), universal serial bus (USB), or Serial-Attached SCSI (SAS).

The control circuitry 120 can also include additional functionality. For example, the control circuitry 120 may support file based storage. The control circuitry 120 can also include functionally for managing power transitions of the wireless device, such as a power manager 124. In some embodiments, the power manager 124 is implemented in firmware. The firmware can then be run by a controller chip, such as a BLE controller.

In one example, the power manager 124 and control circuitry 120 are implemented as part of a BLE controller. The BLE controller can function as the master for power management and can implement the power scheme to control the power flow to all the other peripherals (e.g. sensors, LEDs, COM ports, etc.) and its own radio. For example, the BLE controller may stay awake during a low-power mode, while other components are turned off or in a sleep mode. The BLE controller can then determine when to wake up the other components. The BLE controller may also go into a sleep mode with periodic wakeups, during which the BLE controller searches for connection requests in order to determine whether to wake up the other components.

The wireless device 100 can include one or more transmitters. While parts of the power transition schemes described herein can work with a single transmitter, the more complex algorithms are designed for devices with multiple transmitters. In many embodiments, the wireless device 100 includes a first transmitter 126 and a second transmitter 128. Typically, these transmitters work with different protocols, such as Bluetooth® and Wi-Fi. Often, one of the protocols is longer ranged, but uses more power while the other is shorter ranged, but uses less power. For ease of explanation, the wireless device 100 is described as having transmitters. However, the wireless device may also receive signals and the transmitters can be part of transceiver (transmit and receive) modules or radios.

Various types of wireless devices can utilize the embodiments of the power transition scheme described herein. Such wireless devices can include phones, such as smartphones, cable set-top boxes (not shown), smart televisions (TV's) (not shown), video game devices 134, laptop computers 133, tablet computers 132, desktop computers (not shown), wearable computers (not shown) and/or other network-connected computing devices 137.

The wireless device 100 may be communicatively coupled to one or more client devices via a network 130, such as a local area network (LAN), mesh network, Internet of Things (IoT) network, or the like. For example, the wireless device 100 may provide data storage services to connected devices. The wireless device 100 may be connected to one client device or to multiple client devices. For example, some embodiments may have multiple wireless connection interfaces or physical connection interfaces. Such client devices can include phones, such as smartphones, cable set-top boxes (not shown), smart TV's (not shown), video game devices 134, laptop computers 133, tablet computers 132, desktop computers (not shown), wearable computers (not shown) and/or other network-connected computing devices 137.

Figure 2:
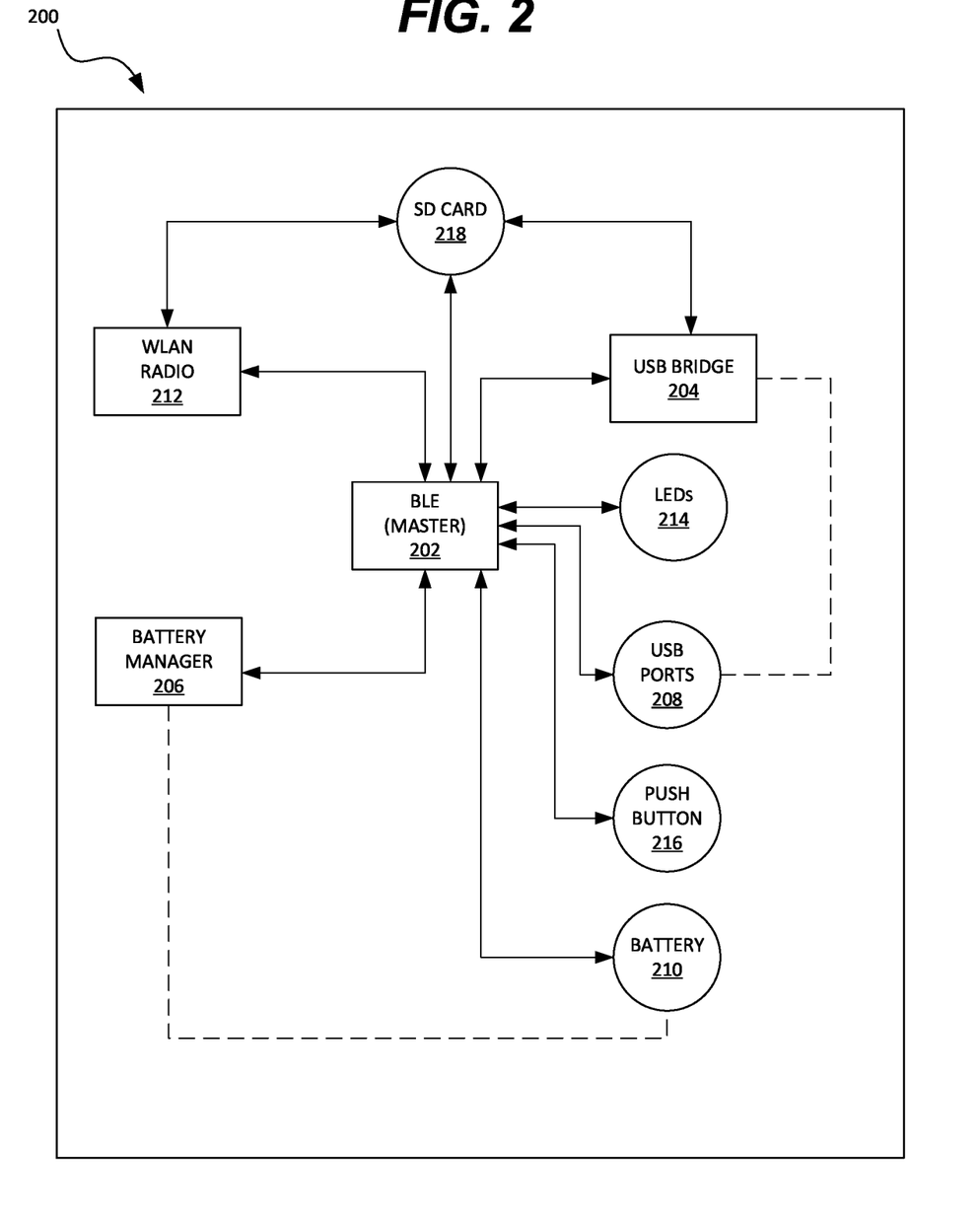
FIG. 2 illustrates a block diagram representing a wireless device with wireless local area network (WLAN) and Bluetooth® transmitters, according to certain embodiments.

FIG. 2 illustrates a block diagram representing a wireless device with WLAN and BLE transmitters, according to certain embodiments. The wireless device 200 of FIG. 2 describes a particular embodiment of the wireless device 100 of FIG. 1. The wireless device 200 can implement the power manager in the BLE module 202, which can act as a master device for the power transition scheme. The BLE module 202 can include Bluetooth® control circuitry and a Bluetooth® radio. The wireless device 200 can also include a WLAN radio 212 and its associated WLAN controller and a USB bridge 204 and its associated USB controller. The power manager may be implemented in the firmware of the BLE module 202. The BLE module 202 can control the power transitions of other components. For example, the BLE module 202 can cause other components to sleep (low-power), turn off, or turn on (active). These operations may involve other modules that have the power interfaces for these other components. For example, the USB bridge 204 and the battery manager 206 may support various power commands for power management of the USB ports 208 and battery 210 respectively. The BLE module 202 can send power commands via these interfaces to control the power state of corresponding components.

In addition, the BLE module 202 can control other components, including other transmitters such as a WLAN radio 212, and input/output devices such as light emitting diodes (LEDs) 214, a push button 216, and an SD card 218.

For ease of reference, these components may be referred to as peripheral devices and are denoted with round blocks in FIG. 2. In some embodiments, the wireless device 200 includes other components, such as a storage medium, a screen, speakers, and/or the like. In addition, while the above has described specific transmitters, the power transition scheme can be used with other types of transmitters that support other protocols. For example, the transmitters can include Bluetooth®, Bluetooth® Low Energy, Zigbee, Z-Wave, IPV6 over Low-Power Wireless Personal Area Networks (6LoWPAN), Thread, WiFi-ah (802.11ah), 2G-5G, Long-Term Evolution (LTE), LTE-M1, Narrowband IoT, near field communication (NFC), radio frequency identification (RFID), SigFox, Ingenu, Weightless-N, Weightless-P, Advanced and Adaptive Network Technology (ANT) & ANT+, DigiMesh, MiWi, EnOcean, Dash7, WirelessHART, and/or the like.

In one implementation, the BLE module 202 is the master device that controls power to all the other peripheral components. Typically, the WLAN radio 212 can be used for data transfers, with data stored in the wireless device's 200 storage medium (not shown). The BLE module 202 can control supplying and cutting off the power to the WLAN radio 212 or the USB bridge 204 and thus can control which of the two has access to the storage medium. In addition, the BLE radio of the BLE module 202 can switch between the low power mode and the ultra-low-power mode, and the BLE module 202 can control when to cut off power to itself by communicating with the battery manager.

In some embodiments, the BLE module 202 is also responsible for managing and authenticating users and client devices via a key exchange or other authentication scheme. Once a client device is verified and connected to the BLE radio, the wireless device can switch to an active mode. In some implementations of the active mode, the peripheral devices are on, but other controllers are still turned off, such as the WLAN or USB controllers. In these implantations, the BLE radio can act as the primary user interface for client devices. Only verified client devices can turn on either the USB controller or the WLAN chip based on commands sent over BLE radio. The BLE module 202 may also ensure that only one controller is on and accessing the SD card 218 at a time, to prevent corruption of the SD card 218 by having multiple controllers write to it at the same time.

Additional safeguards may also be implemented in the wireless device 200. For example, the WLAN password may be shared over the BLE radio, but transmission can be limited to verified client devices only. The WLAN password can be encrypted as client devices that connect may be able to access the storage medium (e.g., SD card 218) the password is stored on. In addition, the wireless device may require a verified user to enable or allow USB mounting on a client device before performing the USB mounting. For example, the user may use an application (e.g., mobile app) on a client device to change the mount setting, with the application then communicating the authorization to the wireless device via the BLE radio.

The added complexity in the case of having two wireless radios (e.g., WLAN and BLE) is the fact that a client device may disconnect from one radio but stay connected to the other radio. For example, the range of a WLAN signal is typically greater than that of a BLE signal. There is a possibility that a client device connected to the WLAN radio 212 during a data transfer may move out of the BLE range and disconnect from the BLE radio. Thus, a power transition scheme that accounts for this scenario is discussed further below.

Power Transition Scheme

Figure 3A:
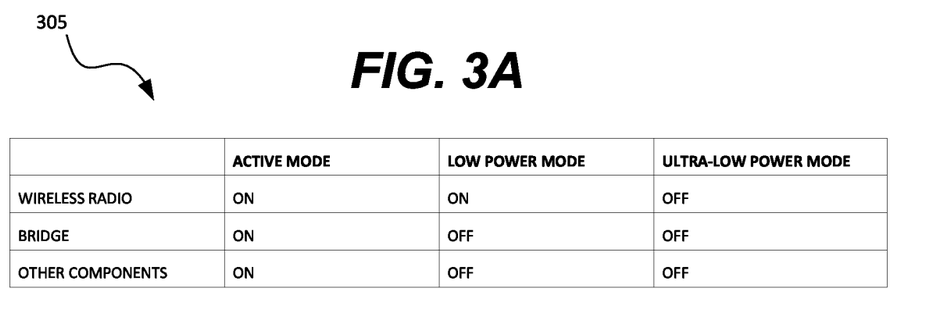
FIGS. 3A and 3B illustrate tables showing the state of the various components of a wireless device (such as those described in FIGS. 1 and 2), according to certain embodiments.
Figure 3B:
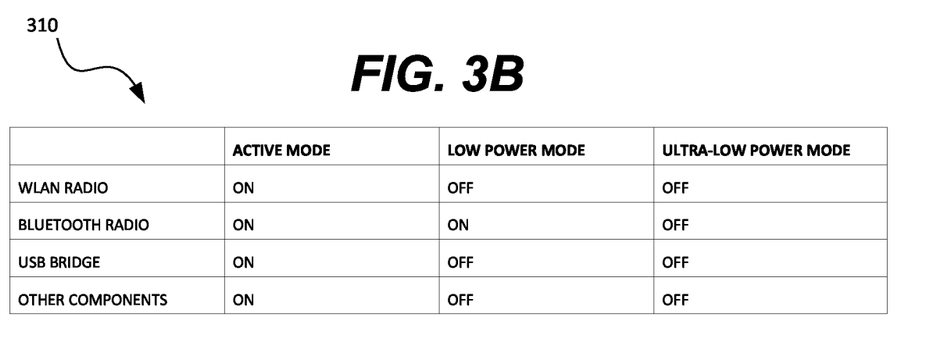

FIGS. 3A and 3B illustrate tables showing the state of the various components of a wireless device 100 (such as those described in FIGS. 1 and 2), according to certain embodiments. Table 305 shows one example of a power scheme for a single transmitter wireless device. Table 310 shows another example of a power scheme for a dual transmitter wireless device (e.g., wireless device 200 of FIG. 2).

Table 305 shows that during an active mode, the wireless radio is on, a data interface bridge (e.g. USB bridge) is on, and other components (e.g., LED's, USB ports, buttons, etc.) are on. In the active mode, the wireless device is operating with full functionality. For example, depending on what type of device it is, the wireless device may serve data files, download files, playback media files, browse the internet, run programs, operate various sensors, and/or control other devices.

The wireless device may transition to a low power mode based on a specific trigger. For example, the trigger can be a disconnect event from when a connected device, either wirelessly or wired (e.g., USB), ends its connection with the wireless device. In another example, the trigger may be a timer reaching a threshold time. The timer may be started based on the last request received from the client or the last activity of the wireless device. During a low power mode, the wireless radio is on, the bridge is off, and the other components are off. The low power mode may also be called a standby mode or sleep mode. In the low power mode, the wireless device is not providing full functionality, but may receive a request within a short time frame that requires going back to the active mode. The wireless radio is kept on so that additional wireless requests can be received.

The wireless device may transition to an ultra-low power mode based on a specific trigger. For example, the trigger may be a timer reaching a threshold time. The timer may be started based on the wireless device entering a low-power mode. If the wireless device is in the low-power mode past a specified amount of time, the wireless device may then transition to the ultra-low power mode. In the ultra-low power mode, the wireless radio is off, the bridge is off and other components are off. The wireless device may periodically or sporadically transition to the low power mode to bring up the wireless radio and determine if any additional requests are forthcoming. Other triggers may also cause the wireless device to transition to other power modes. For example, a physical connection on the interface bridge may cause the wireless device to transition to the active mode.

Table 310 shows the power modes of various components in a dual transmitter wireless device. During the active mode, a WLAN radio is on, a Bluetooth® radio is on, a USB bridge is on, and other components are on. In the active mode, the wireless device is operating with full functionality. For example, depending on what type of device it is, the wireless device may serve data files, download files, playback media files, browse the internet, run programs, operate various sensors, and/or control other devices.

The wireless device may transition to the low power mode based on a specific trigger. For example, the trigger can be a disconnect event from when a connected device, either wirelessly or wired (e.g., USB), ends its connection with the wireless device. In another example, the trigger may be a timer reaching a threshold time. The timer may be started based on the last request received from the client or the last activity of the wireless device. During a low power mode, the WLAN radio is off, the Bluetooth® radio is on, the USB bridge is off, and the other components are off. The low power mode may also be called a standby mode or sleep mode. In the low power mode, the wireless device is not providing full functionality, but may receive a request within a short time frame that requires going back to the active mode. In one embodiment, the wireless device temporarily enters the active mode sporadically or periodically, where the WLAN radio is kept on so that additional wireless requests can be received, before going back to the low power mode. In some embodiments, the Bluetooth® radio may be kept off while the WLAN radio is kept on. This can be more helpful if the wireless requests is more likely to be received over one protocol than the other.

The wireless device may transition to an ultra-low power mode based on a specific trigger. For example, the trigger may be a timer reaching a threshold time. The timer may be started based on the wireless device entering a low-power mode. If the wireless device is in the low-power mode past a specified amount of time, the wireless device may then transition to the ultra-low power mode. In the ultra-low power mode, the WLAN radio is off, the Bluetooth® radio is off, the USB bridge is off, and the other components are off. The wireless device may periodically or sporadically transition to the low power mode to bring the Bluetooth® radio (or alternatively the WLAN radio) on and determine if any additional requests are forthcoming on one of the wireless interfaces. Other triggers may also cause the wireless device to transition to other power modes. For example, a physical connection on the interface bridge (e.g., inserting a physical USB cable into a USB port) may cause the wireless device to transition to an active mode.

The above describes a few examples of possible groupings of what devices are on or off depending on the power mode. The power transition schemes described herein can work with other variations of component groupings and/or component power status. For example, a few other components, such as LEDs or other input/output components, may remain on during the low power mode. Some components may have an additional power state (e.g., standby, sleep, or low-power) in addition to on or off. Those components may enter that power state during the low power mode and/or ultra-low power mode instead of being fully off.

Figure 4A:
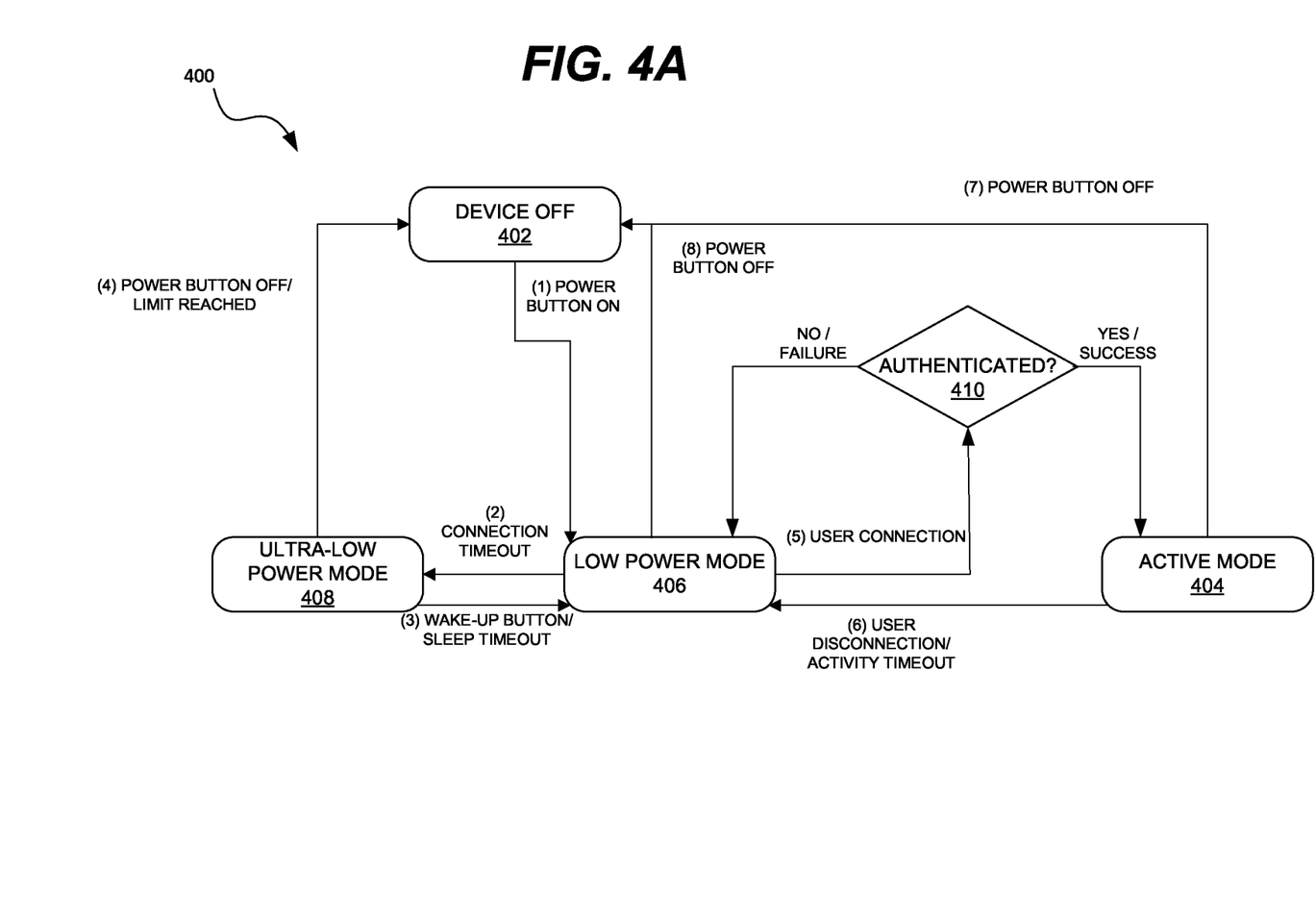
FIGS. 4A and 4B illustrate block diagrams of finite state machines for the power transition scheme, according to certain embodiments.
Figure 4B:
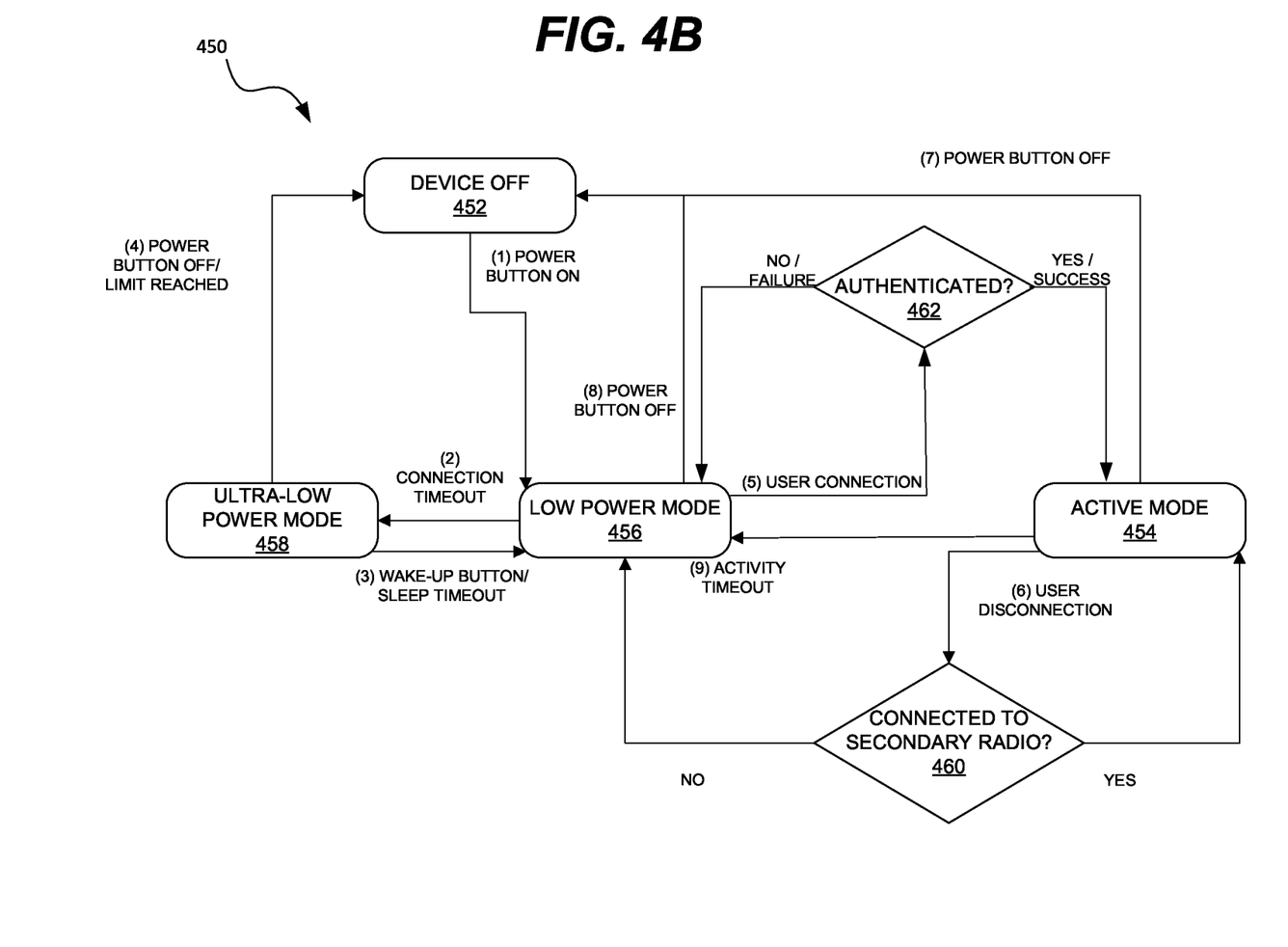

FIGS. 4A and 4B illustrate block diagrams of finite state machines for the power transition scheme, according to certain embodiments. FIG. 4A illustrates a finite state machine for a single transmitter wireless device. FIG. 4B illustrates another finite state machine for a dual transmitter wireless device.

In FIG. 4A, the finite state machine 400 includes several states: device off 402, active mode 404, low power mode 406, and ultra-low power mode 408. A variety of triggers, numbered from (1) to (8), cause the wireless device to transition from one state to another. Several of the triggers are timeout triggers, which can be implemented either as count-up or count-down timers until a specified threshold value (e.g. 0) is reached. Values for the connection timeout, the sleep timeout, the active timeout, and the cycling limit can be customized for any particular wireless device, based on the power calculations and product lifetime requirements of that device. Other embodiments may include additional states and/or triggers.

Assuming the wireless device is in the device off 402 state, (1) turning on the power button causes the wireless device to transition to the low power mode 406. For example, a user pushes the power button on.

In the low power mode 406, a (2) connection timeout can cause the wireless device to transition to the ultra-low power mode 408. For example, the connection timeout may be caused by a client failing to send a data request, a keep-alive message, a response, or other data to establish or maintain a data connection. Alternatively, a (5) user connection from a client device can cause the wireless device to move from the low power mode 406 to the active mode 404. For example, a new client device may send a connection request to the wireless device. The (5) user connection may cause the wireless device to transition to the active mode 404 directly (not shown) or after performing authentication 410.

In some embodiments, the wireless device authenticates 410 the client device in response to the (5) user connection. For example, the client device and the wireless device may exchange authentication tokens or keys to verify that the client device has permission to connect to the wireless device. If the client device is authenticated 410 successfully, the wireless device transitions to the active mode 404. If the client device fails to be authenticated 410, the wireless device remains in the low power mode 406. By performing the authentication prior to the power state transition, the wireless device can eliminate unnecessary transitions due to client devices that lack the appropriate authorization attempting to connect to the wireless device.

Alternatively, in the low power mode 406, (8) pressing the power button off can cause the wireless device to transition to the device off state 402. In some implementations, the power on, power off, and wake-up button may be the same power button, but either turns on, turns off, or puts to sleep the device depending on the current power status of the device or based on a different way of actuating the button (e.g., holding down, pressing once, pressing twice, etc.) In the ultra-low power mode 408, (3) pressing the wake-up button or a sleep timeout can cause the wireless device to transition to the low power mode 406. For example, a user may press the wake-up button (e.g., holding down the power button) or activate an input device to cause the wireless device to wake-up. In another example, the sleep timeout threshold may be reached, after which the wireless device transitions to a low power mode 406 to begin an advertising period where it activates a radio and checks if any wireless communications are incoming. If a request or other communication is received, the wireless device can transition from the low power mode 406 to the active mode 404. If nothing is received, the wireless device can transition from the low power mode 406 to the ultra-low power mode 408.

The switching between the low power mode 406 and the ultra-low power mode 408 is typically fast enough that the client device does not experience much of a lag in connecting to the wireless device. The average time taken for a BLE connection is usually around 2 milliseconds. Therefore, an implementation that stays in the advertising period for about 10 seconds would likely be enough to receive connection requests. Then, turning off the radio for a few seconds before turning it on again, will further save battery life. The amount of time the radio is turned off can be changed based on the desired level of responsiveness. This cycling between the two modes can continue until the client device connects or a cycling limit is reached. Upon reaching the cycling limit, the wireless device power can turn off to further reduce power usage and save battery life.

Alternatively, in the ultra-low power mode 408, (4) pressing the power button off or the cycling limit being reached can cause the wireless device to transition to the device off 402 state. For example, a user can press the power button. In another example, after a limit being reached (e.g., tracked by a count-up or count-down counter) of cycling between the low power mode 406 and the ultra-low power mode 408, the wireless device turns off if no other client communications or other activity trigger are received.

In the active mode 404, a (6) user disconnection or activity timeout can cause the wireless device to transition to the low power mode 406. For example, a client device may disconnect from the wireless device. Such a disconnection may be intentional (e.g., client shuts down or completes transfer) or unintended (e.g., packet collisions or wireless interference). In another example, if no additional requests or activity occurs within a specified time period, an activity timeout event is triggered. Alternatively, (7) pressing the power button off can cause the wireless device to transition to the device off 402 state.

In FIG. 4B, the finite state machine 450 includes several states: device off 452, active mode 454, low power mode 456, and ultra-low power mode 458. A variety of triggers, numbered from (1) to (9), cause the wireless device to transition from one state to another. Several of the triggers are timeout triggers, which can be implemented either as count-up or count-down timers until a specified threshold value (e.g. 0) is reached. Values for the connection timeout, the sleep timeout, the active timeout, and the cycling limit can be customized for any particular wireless device, based on the power calculations and product lifetime requirements of that device. Other embodiments may include additional states and/or triggers.

Assuming the wireless device is in the device off 452 state, (1) turning on the power button can cause the wireless device to transition to the low power mode 456. For example, a user pushes the power button on.

In the low power mode 456, a (2) connection timeout can cause the wireless device to transition to the ultra-low power mode 408. For example, the connection timeout may be caused by a client failing to send a data request, a keep-alive message, a response, or other data to establish or maintain a data connection. Alternatively, a (5) user connection causes the wireless device to move from the low power mode 456 to the active mode 454. For example, a new client device may send a connection request to the wireless device. The (5) user connection may cause the wireless device to transition to the active mode 454 directly (not shown) or after performing authentication 462.

In some embodiments, the wireless device authenticates 460 the client device in response to the (5) user connection. For example, the client device and the wireless device may exchange authentication tokens or keys to verify that the client device has permission to connect to the wireless device. If the client device is authenticated 462 successfully, the wireless device transitions to the active mode 454. If the client device fails to be authenticated 462, the wireless device remains in the low power mode 456. By performing the authentication prior to the power state transition, the wireless device can eliminate unnecessary transitions due to client devices that lack the appropriate authorization attempting to connect to the wireless device.

Alternatively, in the low power mode 456, (8) pressing the power button off can cause the wireless device to transition to the device off state 452. In some implementations, the power on, power off, and wake-up button may be the same power button, but either turns on, turns off, or puts to sleep the device depending on the current power status of the device or based on a different way of actuating the button (e.g., holding down, pressing once, pressing twice, etc.)

In the ultra-low power mode 458, (3) pressing the wake-up button or a sleep timeout can cause the wireless device to transition to the low power mode 456. For example, a user may press the wake-up button (e.g., holding down the power button) or activate an input device to cause the wireless device to wake-up. In another example, the sleep timeout threshold may be reached, after which the wireless device transitions to a low power mode 456 to activate a radio and check if any wireless communications are incoming. If a request or other communication is received, the wireless device can transition from the low power mode 456 to the active mode 454. If nothing is received, the wireless device can transition from the low power mode 456 to the ultra-low power mode 458.

The switching between the low power mode 456 and the ultra-low power mode 458 is typically fast enough that the client device does not experience much of a lag in connecting to the wireless device. The average time taken for a BLE connection is usually around 2 milliseconds. Therefore, an implementation that stays in the advertising period for about 10 seconds would likely be enough to receive connection requests. Then, turning off the radio for a few seconds before turning it on again, will further save battery life. The amount of time the radio is turned off can be changed based on the desired level of responsiveness. This cycling between the two modes can continue until the client device connects or a cycling limit is reached. Upon reaching the cycling limit, the wireless device power can turn off to further reduce power usage and save battery life.

Alternatively, in the ultra-low power mode 458, (4) pressing the power button off or the cycling limit being reached can cause the wireless device to transition to the device off 452 state. For example, a user can press the power button. In another example, after a limit being reached (e.g., tracked by a count-up or count-down counter) of cycling between the low power mode 456 and the ultra-low power mode 458, the wireless device turns off if no other client communications or other activity trigger are received.

In the active mode 454, a (6) user disconnection can cause the wireless device to determine if a client device that disconnected from a first radio is still connected to a secondary radio. For example, the client device may disconnect from the wireless device. Such a disconnection may be intentional (e.g., client shuts down or completes transfer) or unintended (e.g., packet collisions or wireless interference). By obtaining additional status data from other connections that the client device has with the wireless device, the wireless device can better predict whether the disconnection is intentional or unintended. For example, if the client device is not connected to the secondary radio, the wireless device can transition from the active mode 454 to the low power mode 456. If the client device is still connected to the secondary radio, then the wireless device can remain in the active mode, as additional activity is likely.

In some embodiments, additional connection status data for the client device can be obtained from other connections. For example, the wireless device may have a third, fourth, or additional wireless radios and the connection status form those wireless connections can be used in determining whether to transition to the low power mode 456 or remain in the active mode 454. In addition, the connection status of non-wireless connections with the client device (e.g., USB) can also be used to perform the determination.

Alternatively, an (9) activity timeout can cause the wireless device to transition from the active mode 454 to the low power mode 456. For example, if no additional requests or activity occurs within a specified time period, an activity timeout event is triggered. Alternatively, (7) pressing the power button off can cause the wireless device to transition from the active mode 454 to the device off 452 state.

Figure 5A:
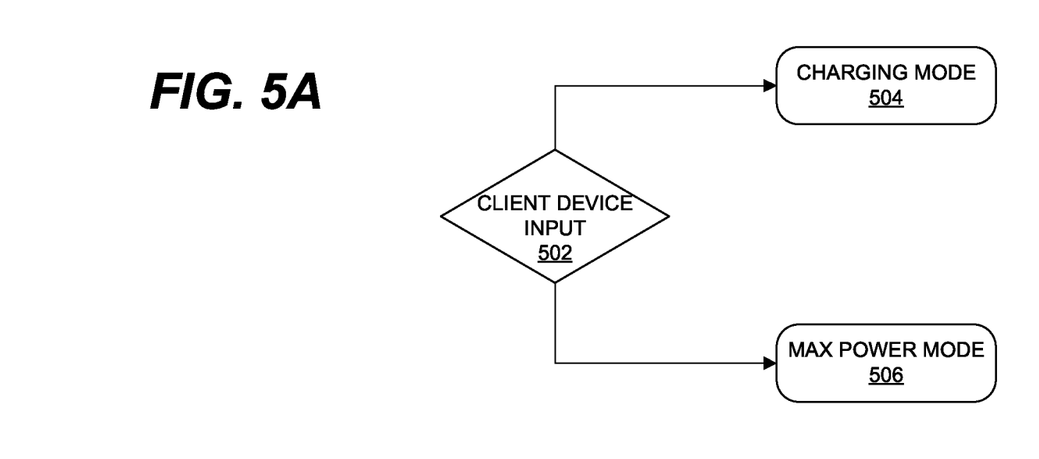
FIGS. 5A and 5B illustrate additional, optional power modes and a corresponding power state table for the wireless device, according to certain embodiments.
Figure 5B:
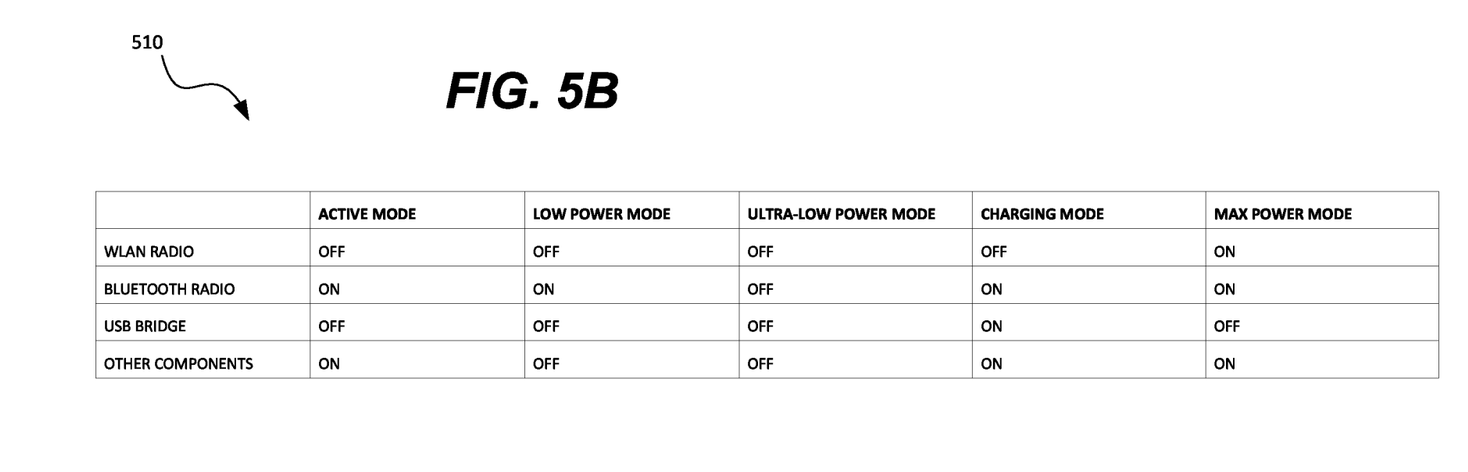

FIGS. 5A and 5B illustrate additional, optional power modes and a corresponding power state table, according to certain embodiments. FIG. 5A includes two additional, optional power modes that can be incorporated into the finite state machines described in FIGS. 4A-4B. The first mode is a charging mode 504 and the second mode is a max power mode 506. Those modes may be entered into based on a client device input 502 or action. For example, if the wireless device is connected to a USB port of a client device (may also be referred to as a host device), the wireless device can enter the charging mode 504 where the wireless device is charging its battery from the client device. In another example, the wireless device may also enter a max power mode 506 in response to a command or other client device input 502 from the client device, where both radios are turned on.

FIG. 5B illustrates a Table 510 showing the power state of the various components of a wireless device that includes the optional charging mode 504 and max power mode 506. During the active mode, a WLAN radio is off, a Bluetooth® radio is on, a USB bridge is off, and other components are on. During the low power mode, the WLAN radio is off, the Bluetooth® radio is on, the USB bridge is off, and the other components are on. During the ultra-low power mode, the WLAN radio is off, the Bluetooth® radio is off, the USB bridge is off, and the other components are off. During the charging mode, the WLAN radio is off, the Bluetooth® radio is on, the USB bridge is on and the other components are on. During the max power mode, the WLAN radio is on, the Bluetooth® radio is on, the USB bridge is off and the other components are on.

In the implementation of the active mode in Table 510, the WLAN radio and controllers other than the Bluetooth® controller start with the power off. The WLAN radio and the controllers can then be turned on based on the client device input 502 (e.g., when entering max power mode). In some implementations, only verified client devices can turn on either the USB controller or the WLAN module based on commands sent over the Bluetooth® radio, after authentication is performed by the Bluetooth® module.

The above describes a few examples of possible groupings of what devices are on or off depending on the power mode. The power transition schemes described herein can work with other variations of component groupings and/or component power status.

Figure 6:
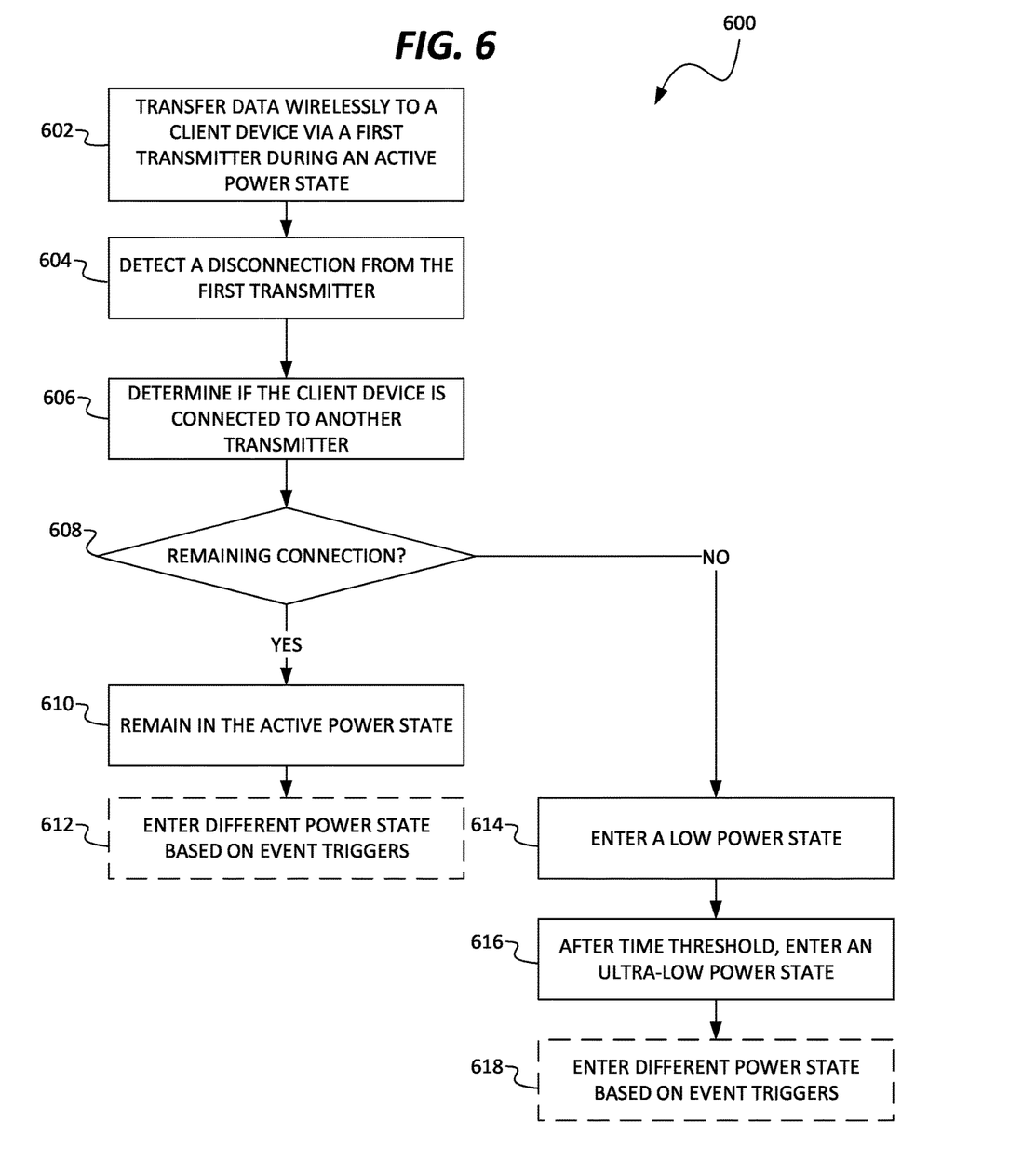
FIG. 6 illustrates a process for transitioning between power modes for a wireless device, according to certain embodiments.

FIG. 6 illustrates a process 600 for transitioning between power modes for a wireless device, according to certain embodiments. At least some of the steps of the process 600 may be implemented by a wireless device 100 or its components, such as its control circuitry 120. For ease of explanation, the following refers to components described in earlier figures. However, the process 600 is not limited to being performed just by those components and other embodiments may use different components to run the process.

At block 602, the wireless device 100 transfers data wirelessly to a client device via a first transmitter 126 during an active power state. The transfer may be initiated in response to a request by the client device. For example, the client device may be requesting data from the wireless device 100, such as a data file or sensor readings. In some embodiments, the client device and the wireless device may be part of the same network, such as a home automation network or local area network.

The first transmitter 126 may also support receiving of data. For example, the first transmitter 126 may be a WLAN radio that supports the various Wi-Fi protocols (e.g., 802.11a/b/n/g/ax/ac etc.). In some embodiments, the first transmitter uses relatively higher power in order to support faster data transfers.

At block 604, the wireless device 100 detects a disconnection from the first transmitter 126. The disconnection may be intended (e.g., transfer completed) or unintended (e.g., packet collision or wireless interference). If the disconnection is intended and no other client devices are disconnected, then it is likely that no further data requests are incoming and the wireless device can transition to a lower power state. If the disconnection is unintended, then it is likely that the client device will try to reconnect to the device.

At block 606, the wireless device 100 determines if the client device is connected to another, second transmitter of the wireless device 100. By looking at the connection status on the second transmitter, the wireless device 100 can obtain data that may be better predict the next actions of the client device. If the client device is still connected to the second transmitter, then the client device is still likely to request additional data transfers with the wireless device 100. In those situations, the wireless device 100 can remain in the active power mode to await further requests. If the client device is not connected to the second transmitter, then the disconnection was likely intended and there is a higher chance that additional data requests are not incoming.

The second transmitter 128 may also support receiving of data. For example, second transmitter 128 may be a Bluetooth® or BLE radio. In some embodiments, the second transmitter is shorter ranged and/or has lower data throughput in comparison to the first transmitter in order to support lower power usage.

At block 608, if the wireless device 100 determines that the client device is connected to the second transmitter 128, the wireless device proceeds to block 610. If the wireless device 100 determines that the client device is not connected to the second transmitter, the wireless device proceeds to block 614.

There are a variety of techniques for determining that the client device is still connected. For example, when starting a connection, the client device provides a network address (e.g., Internet Protocol address) and/or a hardware identifier (e.g., media access control address). By comparing the network address and/or hardware identifier received on the first transmitter with the second transmitter, the wireless device can determine that the same client device is still connected.

At block 610, where the client device remains connected to another transmitter, the wireless device 100 remains in the active power state. The wireless device 100 then waits for a data requests from a client device or for another event trigger to transition to a different state, as discussed in additional detail in FIGS. 4A-4B. The process 600 can end or may optionally continue based on additional event triggers.

Optionally, at block 612, further event triggers may be received that transition the wireless device 100 into a different power state. For example, a new disconnection event may cause the process to proceed back to block 606 to determine if the disconnected client device is still connected to another transmitter, as previously discussed above. Alternatively, a timeout event trigger can occur when a time threshold is reached where no additional activity occurs. In that situation, the process 600 can proceed to block 614.

Going back to block 614, where the client device has no remaining connections as determined in block 608, the wireless device 100 enters a low power state. In the low power state, various components of the wireless device are turned off, as discussed earlier in FIGS. 3A-3B.

At block 616, after the wireless device 100 remains in the low power state without additional client activity for a specified time threshold, the wireless device 100 enters an ultra-low power state. The process 600 can then end. Optionally further event triggers may be received that move the wireless device 100 into a different power state.

Optionally, at block 618, further event triggers may be received that move the wireless device 100 into a different power state. For example, a new connection event may cause the process to proceed back to block 602 to transfer data wirelessly to a client device, as previously discussed above. Alternatively, a timeout event trigger can occur when a time threshold is reached where no additional activity occurs. In that situation, the wireless device 100 may turn off. Various event triggers that can cause a change of power state are discussed in additional detail in FIGS. 4A-4B.

Additional Embodiments

Those skilled in the art will appreciate that in some embodiments, other types of data storage devices can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device comprising:
a power source;
a data storage medium;
a first transmitter configured to provide wireless data transfer using a first protocol;
a second transmitter configured to provide wireless data transfer using a second protocol;
a Universal Serial Bus (USB) bridge configured to provide data transfer using a USB protocol; and
control circuitry configured to:
provide a plurality of connections for transfer of data between the data storage device and a client device using one or more of the first transmitter, the second transmitter, or the USB bridge based on a respective protocol;
provide a plurality of power modes of the data storage device including a first power mode and a second power mode, wherein the first power mode is an active mode of the data storage device and the second power mode utilizes less power than the first power mode;
in the first power mode:
transfer data wirelessly to the client device via the first transmitter using the first protocol, wherein the first transmitter, the second transmitter, and the USB bridge are configured to be turned on in the first power mode, and wherein the control circuitry is further configured to provide full power to the first transmitter, the second transmitter, and the USB bridge in the first power mode; and
in response to a disconnection of the client device from the first transmitter during the first power mode:
determine whether the client device is connected to the second transmitter in the first power mode, wherein the second transmitter is configured to transfer data wirelessly to the client device using the second protocol;
determine whether the client device is connected to the USB bridge in the first power mode, wherein the USB bridge is configured to transfer data to the client device using the USB protocol;
in response to determining that the client device is connected to the second transmitter or the USB bridge in the first power mode, remain in the first power mode; and
in response to determining that the client device is disconnected from the second transmitter and the USB bridge in the first power mode, enter the second power mode; and
in the second power mode:
turn off the first transmitter and the USB bridge.

2. The data storage device of claim 1, wherein the control circuitry is further configured to turn off the second transmitter in the second power mode in addition to the first transmitter and the USB bridge.

3. The data storage device of claim 1, wherein the control circuitry is further configured to:
in response to determining that a threshold time has passed since the client device disconnected from the first transmitter, the second transmitter, and the USB bridge, enter a third power mode that utilizes less power than the second power mode.

4. The data storage device of claim 3, wherein the second power mode is a low power mode and the third power mode is an ultra-low power mode.

5. The data storage device of claim 4, wherein the control circuitry is further configured to use a finite state machine to determine transitions between the active mode, the low power mode, and the ultra-low power mode.

6. The data storage device of claim 4, wherein the control circuitry is further configured to:

in response to entering the low power mode, turn off power to one or more components of the data storage device, including the first transmitter and the USB bridge; and maintain power to the second transmitter.

7. The data storage device of claim 4, wherein the control circuitry is further configured to:

in response to entering the ultra-low power mode, turn off power to other components of the data storage device, including the first transmitter, the second transmitter, and the USB bridge; and place the control circuitry into a sleep mode.

8. The data storage device of claim 7, wherein the control circuitry is further configured to:

while in the ultra-low power mode, periodically enter the low power mode by powering up the control circuitry and at least one of the first transmitter and the second transmitter; and in the low power mode, listen for a wireless request from another device.

9. The data storage device of claim 1, wherein in the active mode, components of the data storage device are configured to operate at full power.

10. The data storage device of claim 1, wherein the control circuitry is further configured to:

authenticate the client device prior to entering the active mode.

11. The data storage device of claim 1, wherein the first transmitter comprises a wireless local area network (WLAN) radio.

12. The data storage device of claim 1, wherein the second transmitter comprises a Bluetooth radio.

13. The data storage device of claim 1, wherein the control circuitry comprises first control circuitry associated with the first transmitter, second control circuitry associated with the second transmitter, and third control circuitry associated with the USB bridge, wherein the second control circuitry is configured to function as master control circuitry and to instruct the first control circuitry and the third control circuitry in connection with entering different power modes.

14. A method for transitioning between power modes of a data storage device, the method comprising:

providing a data storage device comprising a power source, a data storage medium, a first transmitter configured to provide wireless data transfer using a first protocol, a second transmitter configured to provide wireless data transfer using a second protocol, a Universal Serial Bus (USB) bridge configured to provide data transfer using a USB protocol, and control circuitry;

providing, by the control circuitry, a plurality of connections for transfer of data between the data storage device and a client device using one or more of the first transmitter, the second transmitter, or the USB bridge based on a respective protocol;

providing, by the control circuitry, a plurality of power modes of the data storage device including a first power mode and a second power mode, wherein the first power mode is an active mode of the data storage device and the second power mode utilizes less power than the first power mode;

in the first power mode:

transferring data wirelessly to the client device via the first transmitter using the first protocol, wherein the first transmitter, the second transmitter, and the USB bridge are configured to be turned on in the first power mode, and wherein full power is provided to the first transmitter, the second transmitter, and the USB bridge in the first power mode; and in response to a disconnection of the client device from the first transmitter during the first power mode:

determining whether the client device is connected to the second transmitter in the first power mode, wherein the second transmitter is configured to transfer data wirelessly to the client device using the second protocol;

determining whether the client device is connected to the USB bridge in the first power mode, wherein the USB bridge is configured to transfer data to the client device using the USB protocol;

in response to determining that the client device is connected to the second transmitter or the USB bridge in the first power mode, remaining in the first power mode; and in response to determining that the client device is disconnected from the second transmitter and the USB bridge in the first power mode, entering the second power mode; and in the second power mode:

turning off the first transmitter and the USB bridge.

15. The method of claim 13, further comprising:

in response to determining that a threshold time has passed in the second power mode without receiving additional communications from client devices, entering a third power mode that utilizes less power than the second power mode.

16. The method of claim 15, wherein the second power mode is a low power mode and the third power mode is an ultra-low power mode.

17. The method of claim 16, further comprising:

in response to entering the low power mode, turning off power to one or more components of the data storage device, including the first transmitter and the USB bridge; and maintaining power to the second transmitter.

18. The method of claim 16, further comprising:

in response to entering the ultra-low power mode, turning off power to other components of the data storage device, including the first transmitter, the second transmitter, and the USB bridge; and placing the control circuitry of the data storage device into a sleep mode.

19. The method of claim 16, further comprising:

while in the ultra-low power mode, periodically entering the low power mode by powering up the control circuitry of the data storage device and at least one of the first transmitter and the second transmitter; and in the low power mode, listening for a wireless request from another device.

20. A data storage device comprising:

means for providing power;

means for storing data;

first means for communicating wirelessly configured to provide wireless data transfer using a first protocol;

second means for communicating wirelessly configured to provide wireless data transfer using a second protocol;

a Universal Serial Bus (USB) bridge configured to provide data transfer using a USB protocol; and control circuitry configured to:

provide a plurality of connections for transfer of data between the data storage device and a client device using one or more of the first means for communicating wirelessly, the second means for communicating wirelessly, or the USB bridge based on a respective protocol;

provide a plurality of power modes of the data storage device including a first power mode and a second power mode, wherein the first power mode is an active mode of the data storage device and the second power mode utilizes less power than the first power mode;

in the first power mode:
   transfer data wirelessly to the client device via the first means for communicating wirelessly using the first protocol, wherein the first means for communicating wirelessly, the second means for communicating wirelessly, and the USB bridge are configured to be turned on in the first power mode, and wherein the control circuitry is further configured to provide full power to the first means for communicating wirelessly, the second means for communicating wirelessly, and the USB bridge in the first power mode; and
   in response to a disconnection of the client device from the first means for communicating wirelessly during the first power mode:
      determine whether the client device is connected to the second means for communicating wirelessly in the first power mode, wherein the second means for communicating wirelessly is configured to transfer data wirelessly to the client device using the second protocol;
      determine whether the client device is connected to the USB bridge in the first power mode, wherein the USB bridge is configured to transfer data to the client device using the USB protocol;
      in response to determining that the client device is connected to the second means for communicating wirelessly or the USB bridge in the first power mode, remain in the first power mode; and
      in response to determining that the client device is disconnected from the second means for communicating wirelessly and the USB bridge in the first power mode, enter the second power mode; and in the second power mode:
   turn off the first means for communicating wirelessly and the USB bridge.

* * * * *